Figure 1:
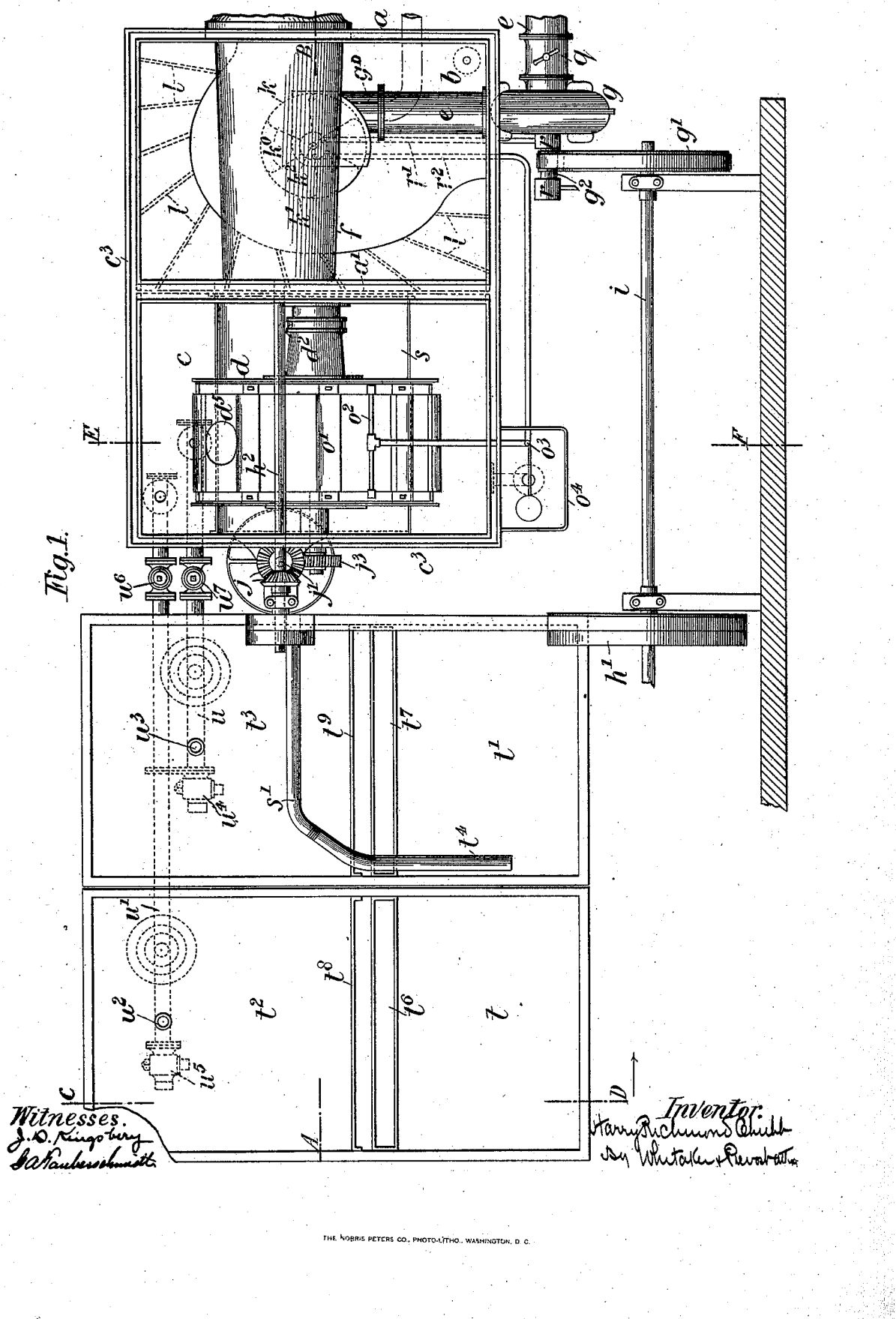

(No Model.) 4 Sheets—Sheet 1.

H. R. CHUBB.
APPARATUS FOR PURIFYING SMOKE OR GASES.

No. 575,877. Patented Jan. 26, 1897.

Witnesses.
Inventor:

(No Model.) 4 Sheets—Sheet 2.

H. R. CHUBB.
APPARATUS FOR PURIFYING SMOKE OR GASES.

No. 575,877. Patented Jan. 26, 1897.

Witnesses.
Inventor

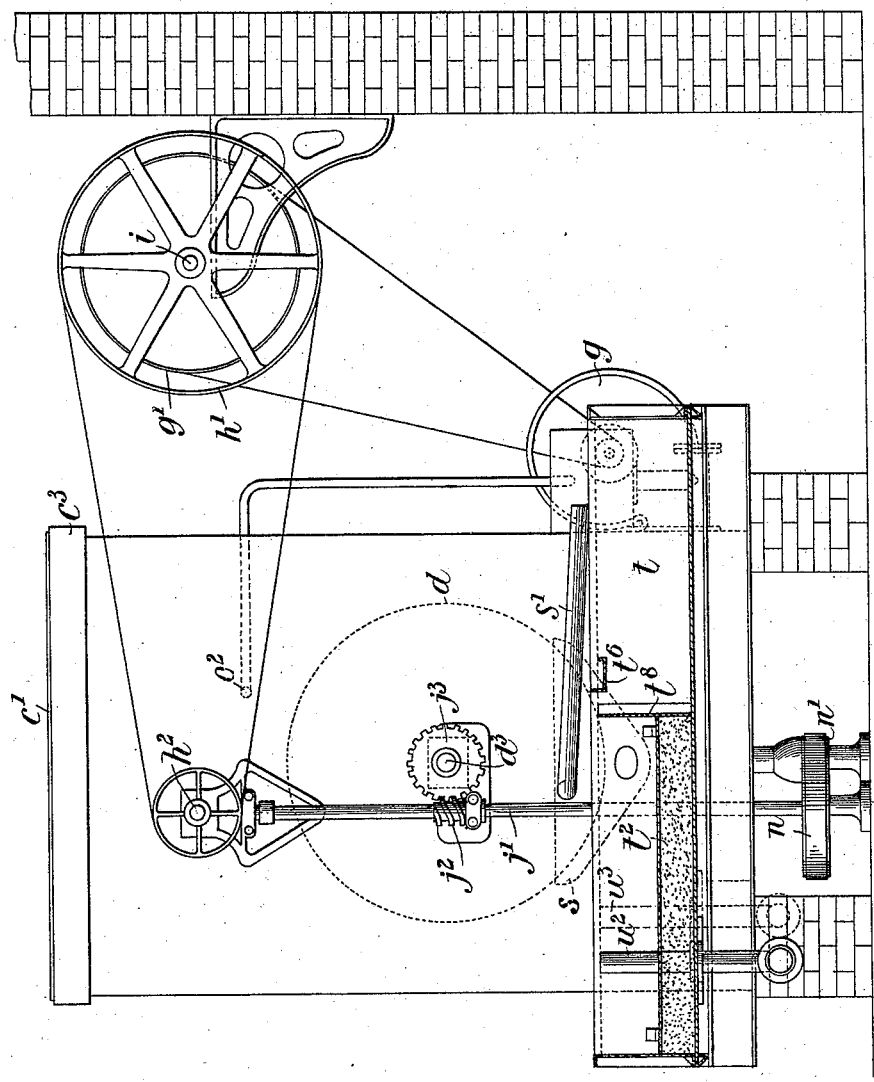

(No Model.) 4 Sheets—Sheet 4.
H. R. CHUBB.
APPARATUS FOR PURIFYING SMOKE OR GASES.
No. 575,877. Patented Jan. 26, 1897.
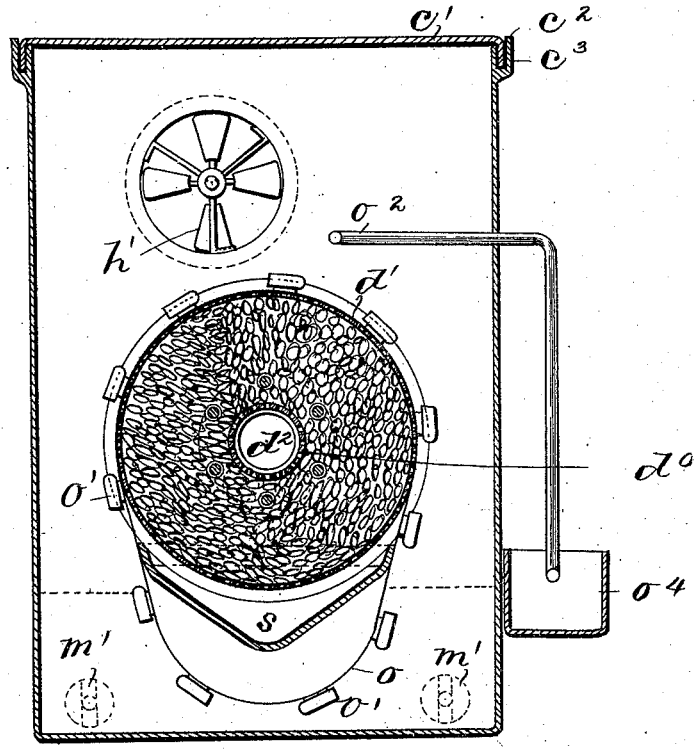
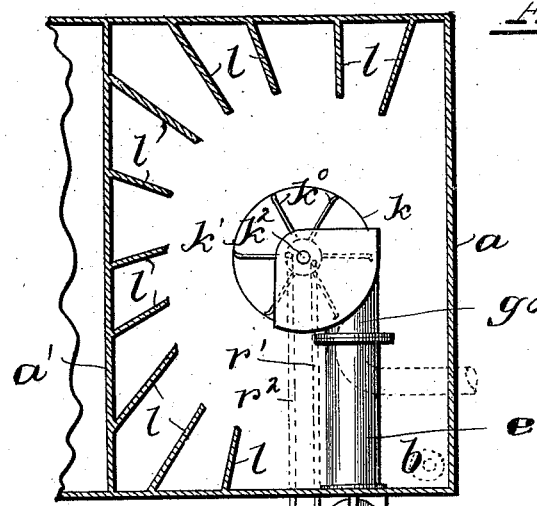
Witnesses
G. A. Tauberschmidt,
J. D. Kingsbury
Inventor
Harry R. Chubb
By Whitaker & Prevost
Attys.

United States Patent Office.

HARRY RICHMOND CHUBB, OF LONDON, ENGLAND.

APPARATUS FOR PURIFYING SMOKE OR GASES.

SPECIFICATION forming part of Letters Patent No. 575,877, dated January 26, 1897.

Application filed May 11, 1896. Serial No. 591,062. (No model.)

*To all whom it may concern:*

Be it known that I, HARRY RICHMOND CHUBB, a subject of the Queen of Great Britain, residing at London, England, have invented new and useful Improvements in Machinery Applicable for Filtering, Condensing, and Absorbing Air, Smoke, Fumes, and other Gases or for Cooling or Heating Water or other Liquids, of which the following is a specification.

This invention relates to apparatus or machines for filtering, washing, condensing, cooling, or heating air, steam, and smoke or other gases produced by steam engines and boilers, furnaces, kilns, or chemical apparatus; for cooling or heating water or other liquids; for impregnating alkaline, acid, or neutral solutions with waste or other gases and vapors for impregnating air or vapors with gases contained in solutions for purposes of disinfecting buildings, drains, or sewers or rendering innocuous vapors proceeding therefrom or for producing cooled or heated air for supplying public or other buildings, either for purposes of ventilation or otherwise.

The machine, as I prefer to construct it, is provided with a drum the cylindrical portion of which is made of wirework, perforated plate, or other suitable open-work, and has within it a smaller cylinder or hollow body made of similar open-work. The space between these two cylinders is wholly or partly filled with charcoal, coke, shells, cork, small pieces of wood, fire-brick, asbestos, or any convenient material suitable for resisting the action of heat, acids, or strong alkaline solutions, as desired. This double drum, hereinafter referred to as the "filter-drum," revolves on bearings or antifriction-rollers in a tank or chamber for containing water or an alkaline, acid, or neutral solution, according to the particular purpose for which the apparatus may be applied, whereby the material in the said filter-drum is constantly maintained in a wet condition, so that as the gases are forced through the said material they will come into intimate contact with the wetted surface thereof. The said tank or chamber has a movable cover and is provided with a chimney or tube to convey away the filtered air, fumes, or gases. The joint between the cover and the walls of the chamber may be made by means of water or water and sand or by any of the ordinary methods.

As applied for the treatment of smoke from boiler or other chimneys or kilns or other apparatus producing fumes or gases containing particles of carbon or ash, oil, or other impurities of a nature capable of being partially separated by means of a depositing-chamber a convenient construction and arrangement of apparatus is as follows, reference being had to the accompanying drawings, in which—

Figure 2:
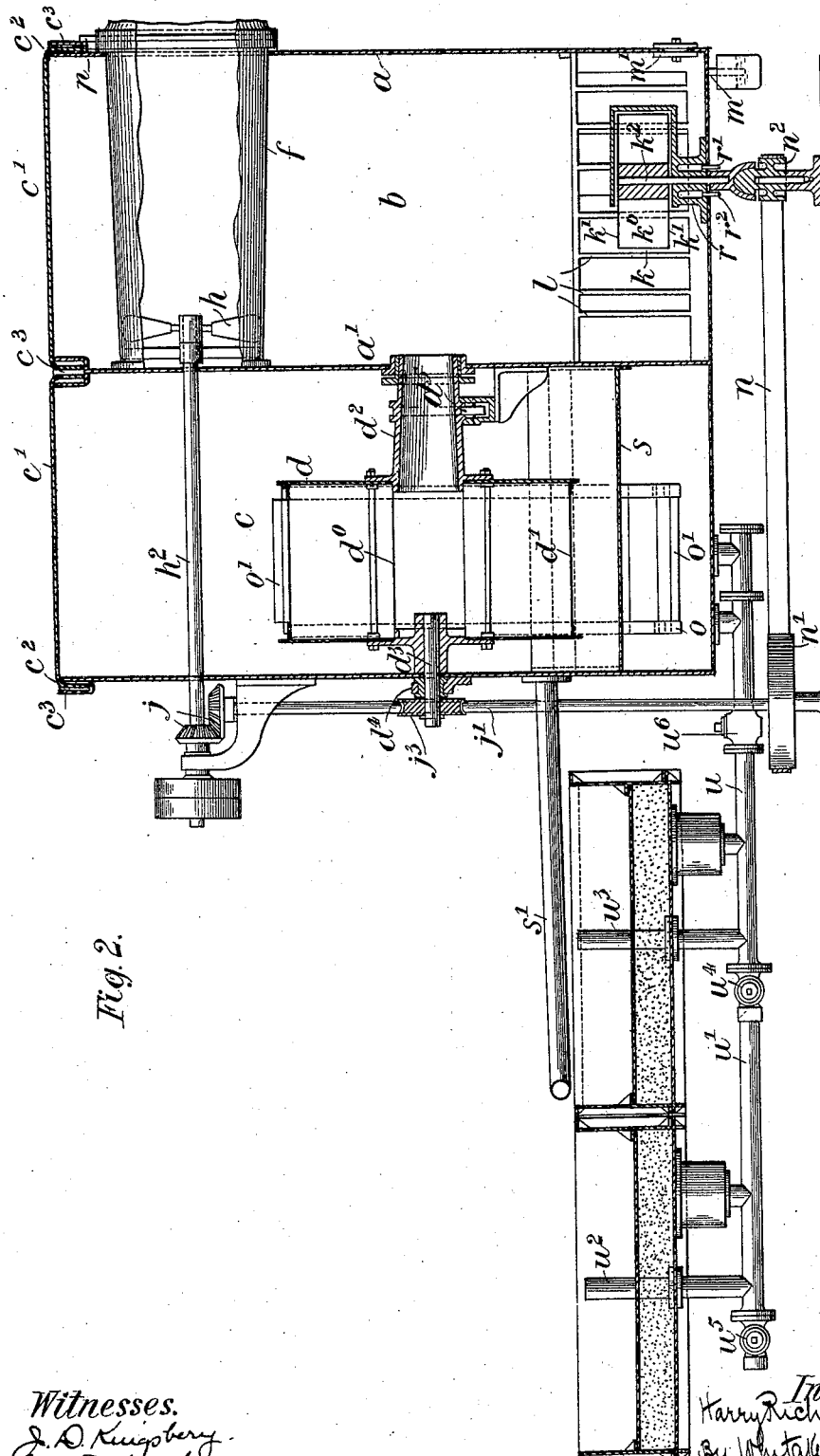

Figure 1 is a plan of a general arrangement of the apparatus, the cover being removed. Fig. 2 is a section on the line A B, Fig. 1. Fig. 3 is a section on the line C D, Fig. 1, looking in the direction of the arrow. Fig. 4 is a section on the line E F, Fig. 1. Fig. 5 represents a horizontal section through the lower part of the receiving-chamber and the centrifugal device.

$a$ indicates a casing divided by a partition $a'$ to form two chambers $b$ $c$, each of which is provided with a removable cover $c'$, having a flange $c^2$, dipping into a channel $c^3$, containing water, sand, or the like, the chamber $b$ serving to receive the smoke before passing through the filter and the chamber $c$ to receive it after passing through the filter and being hereinafter referred to as the "receiving" and "filtering" chambers, respectively. The chamber $c$ contains the liquid for wetting the material in the filter-drum.

$d$ is the filter-drum, and $d^0$ $d'$ are the inner and outer open-work cylinders thereof. This filter, which is provided on one side with a hollow casting $d^2$, forming a passage between the receiving-chamber $b$ and the interior of the filter, is carried at one end by a spindle $d^3$ in a bearing $d^4$ and at the other end by antifriction-rollers $d^5$ $d^5$, upon which the casting $d^2$ runs. If desired, rollers may be arranged to carry the drum at its periphery.

$e$ is a tube or passage through which the gases to be treated are introduced into the apparatus, and $f$ is a tube for conducting the filtered gases from the depositing-chamber to a chimney or elsewhere.

The gases or fumes to be dealt with are delivered into the chamber $b$ by means of a fan $g$ or a blower or by a jet of steam or compressed air through a nozzle $g^0$, (indicated by dotted lines in Fig. 1,) or by other suitable means, from whence they pass to the hollow center of the filter, thence through the filtering material into the chamber $c$, and thence through the tube $f$.

The draft of the chimney may be assisted, if desirable, by introducing a second fan $h$ or jet between the chamber $c$ and the chimney. If a fan be used, one of the low-pressure class, such as indicated, is preferable.

Rotary motion can be communicated to the filter $d$ and the fans $g$ and $h$ by any suitable means. As shown in the drawings, a shaft $i$ is provided with two pulleys $g'$ $h'$, connected by belts with pulleys on the spindles $g^2$ $h^2$ of the fans $g$ $h$, respectively. Motion is imparted to the filter from the spindle $h^2$ of the fan $h$ through the medium of the bevel-wheels $j$, the shaft $j'$, the worm $j^2$, and the worm-wheel $j^3$.

To assist in separating particles of impurities or moisture contained in the fumes or vapors treated, I sometimes arrange opposite to the inlet tube or nozzle $e$ a centrifugal device $k$, consisting of a series of curved fan-blades $k^0$ $k^0$, fixed between two disks $k'$ $k'$, keyed on a shaft $k^2$, to which a rotary motion is imparted, and on the walls of the receiving-chamber $b$ I fit a series of baffle-plates $l$ $l$, perforated or not, as desired. With this arrangement as the centrifugal device rotates the impurities referred to are thrown against the baffle-plates $l$ and run down the same, a trapped pipe $m$ extending downwardly into a fluid vessel or trap $m^0$, or other suitable means being provided for draining off any liquid matter. Any solid matter which collects may be removed from the bottom of the receiving-chamber $b$ through soot-doors $m'$ $m'$, provided for the purpose.

The centrifugal device $k$ may be rotated by means of a belt $n$, running upon a pulley $n'$ on the shaft $j'$ and upon another pulley $n^2$ upon the shaft $k^2$ of the centrifugal device. In practice the shaft $k^2$ is made in two parts, as shown, connected by friction-cones, for a purpose which is well understood in connection with centrifugal apparatus.

When the gases to be purified or treated enter the receiving-chamber with great velocity, they will serve to drive the centrifugal device and obviate the necessity of driving it otherwise, and the power resulting from the operation of the centrifugal device under the force of the incoming gases will be communited to the driving mechanism for the drum by the mechanism hereinbefore described and will assist in driving the same. Other driving mechanism for the drum might obviously be omitted in such case.

Revolving around and with the filter-drum $d$ is an endless band or chain $o$, to which are attached buckets $o'$ $o'$, after the manner of a chain-pump. These buckets, as the filter-drum revolves, dip into the water or solution contained in the chamber $c$ and discharge their contents in a shower over the filtering material in the drum as each bucket is traveling through the upper half of the drum's circuit. The band or chain is of a length suitable to reach to the bottom of the chamber $c$. For certain purposes it is more convenient to dispense with the band or chain and fix the buckets on the periphery of the drum itself, either on the outside or the inside, or on both; or the same object may be effected or be supplemented by a spray of water or solution delivered over the top of the drum through a perforated pipe $o^2$, connected to a supply-pipe, the flow being continuous or regulated by a ball-cock $o^3$, fixed in the small tank $o^4$, communicating with the filtering-chamber $c$ and serving to maintain a uniform depth of water in the said chamber $c$.

The solid matter intercepted by the filtering substances and the water or solution impregnated with the absorbed gases escape through the perforations at the bottom of the cylinder-drum, while the spent or filtered gases or vapors from the perforations at the top of the drum escape into the top of the chamber $c$ and are discharged through the tube $f$, and, if desired, the said gases may be returned to the chimney at a point higher up than that from which they were introduced into the chamber $b$. The said exit-tube $f$ is fitted with a valve or damper $p$, and the pipe or tube through which the gases to be treated are introduced into the fan $g$ is also provided with a valve $q$, Fig. 1. A damper is also placed in the inlet-pipe $e$, near the base of the chimney, if found desirable, although valve $q$ will ordinarily be sufficient. By means of this system of dampers and valves the direction of the gases to and from the apparatus is regulated or the apparatus is put entirely out of action.

In order to prevent the possibility of the casing of the fan $g$ and its bearings, together with the bearings of the shaft $k^2$, from becoming heated, jackets $r$ may be formed, through which water may be caused to circulate, $r'$ $r^2$ being the circulating-pipes.

When the filter-drum is constructed without the buckets fixed to its periphery and has, instead, the buckets attached to an endless band or chain, as shown in the drawings, the water or solution with the intercepted solid matter coming away at the bottom of the said filter-drum may be delivered into a trough $s$, which may deliver through a pipe $s'$ into settling-tanks $t$ $t'$, fitted with filters $t^2$ $t^3$, (by means of which all solids are separated,) instead of falling from the drum into the filtering-chamber $c$ direct. The tanks $t$ $t'$, with their filters $t^2$ $t^3$, are used alternately by shifting the hose $t^4$, attached to the pipe $s'$, from one tank to the other, so that one tank and filter may be cleaned out while the other is working. The tanks $t$ $t'$ may be fitted with scum shelves or boards $t^6$ and $t^7$, and the divisions $t^8$ and $t^9$, separating the filters from the settling portions of the tanks, are made of such a height that they form a weir over which the water or solution flows into the filters. The filtered liquor returns to the filtering-chamber c through the pipes u u' and is kept continually circulating. $u^2 u^3$ are overflow stand-pipes connected to the pipes u and u' and come into use if the filters become dirty and clogged. $u^4 u^5$ are draw-off taps from the filters, by which the liquor, when saturated with the gases, may be drawn off. $u^6 u^7$ are cocks shutting off communication between the filters $t^2 t^3$ and the filtering-chamber c. The trough s may have communication with both the settling-tanks t t', as well as with the drum-tank, by means of a three-way tap or taps fixed in or in connection with the pipe s' or by the simple means of closing the end of the hose $t^4$ and allowing the trough s to overflow into the chamber c.

The filter-drum d is provided with a manhole or hand-hole $d^5$ for purposes of cleaning or recharging it with fresh filtering material.

In treating gases from boilers or other sources where the exhaust-steam from the engine goes up the chimney, such as those of the locomotive or portable or semi-portable type, two or more machines may be used, one for the smoke, or smoke and part of the steam, and a second, or more, if desirable, for treating the remainder of the steam, a branch pipe from the exhaust feeding the second machine the drum of which may revolve in an alkaline or other solution for the purpose of further purifying the steam of oil or other impurities and then delivering its uncondensed steam (for the solution would be maintained at or about boiling-point) into a third machine, so that a supply of nearly-boiling and softened water may be produced for boiler-feeding or other purposes.

When the machine is used for purposes of steam-condensing or water-heating only, and where it is not required to separate any of the impurities which the steam or heated air or gases may contain, the receiving-chamber b and centrifugal device k may be dispensed with, as also may the tanks t t' and filters $t^2 t^3$.

When treating gases and vapors with which no solid matters are mixed, the receiving-chamber b with the centrifugal device may be dispensed with, as also may the tanks t t' and filters $t^2 t^3$, if desirable.

It is obvious that the process of cooling or heating air, gases, or vapors also effects at the same time the heating and cooling, respectively, of the liquid used as the medium, and vice versa. Similarly, also, would the impregnation or aeration of a liquid with a gas likewise, in many cases, be at the same time effected. Conversely air, gas, or vapors would be impregnated or mingled with a gas given off by a solution under treatment, the liberation of which gas may be by heat or other means.

When used for impregnating alkaline, acid, or neutral solutions with gases produced in any chemical or manufacturing operation, such as the production of carbon dioxid by the fermentation of brewers' and distillers' wort, or from the kilns of lime or cement works, the said gases being either a waste product or produced for the purpose of being absorbed by the said solution, the depositing-chamber may here also be dispensed with. In cases where a solution is used which, on becoming saturated with the gas it is absorbing, will crystallize out the settling-tanks t t' serve the purpose of crystallizing-pans, each being used alternately or in turn where a number are used.

If desirable, a series of these machines may be used, arranged in such a manner that the escaping gases from the first machine deliver into the hollow center of the second and the second into the third, and so on. When purifying or absorbing gases of a complex nature, the various tanks will be supplied with solutions of a kind suitable for absorbing the various constituents of the gas under treatment.

A supply of filtered and cooled air may be obtained for ventilating public or other buildings, or for other purposes, by blowing air through the machine, the tank being supplied with water cooled artificially, or direct from a well, water-main, or other supply; or a supply of filtered and warmed air may be obtained for similar purposes by substituting warm or hot water (which may be treated with a disinfectant) for cold, the filtered air being delivered into the building through suitable gratings in the floor or walls or by funnel-mouthed pipes fixed at intervals around the walls at suitable heights and carried up from the main pipe below or on the floor.

Sewers and drains may be ventilated and the escaping gases disinfected or rendered harmless by passing them through the machine, the tank being supplied with a disinfectant solution which may be heated or otherwise.

For whatever purpose the machine be used the air or gases to be treated are delivered into the machine under pressure as described when dealing with fumes from boilers and other sources, or may be drawn through instead of forced, or both may be used in conjunction.

It is obvious that the direction of the current of gases dealt with may be reversed by making the gases enter the drum by the perforations in its circumference and allowing them to escape by way of the hollow center, or where more than one drum is used the two arrangements may be combined, so that the initial inlet of the gases may be by the hollow center of one drum and the final outlet by the hollow center of another.

Having now particularly described and ascertained the nature of my said invention and in what manner the same is to be performed, I declare that what I claim is—

1. The combination with an inclosing casing of a revoluble drum located therein provided with an inlet-aperture adjacent to its central portion and discharge-apertures adjacent to its periphery, a filling of comminuted material in said drum between its axis and periphery and means for maintaining said material continuously in a wetted condition, substantially as described.

2. The combination with an inclosing casing of a revoluble drum located therein comprising among its members an outer perforated cylindrical casing and an inner perforated casing, a filling of comminuted material between said casings, means for passing gaseous products through said perforated casings and said material and means for maintaining said material continuously in a wet condition, substantially as described.

3. The combination with the inclosing casing, of a revoluble perforated drum therein provided with a filling of comminuted material, a fluid-receptacle located below the lowest portion of said drum, an endless carrier provided with buckets passing over said drum, having a portion depending below the drum and into said fluid-receptacle and means for passing gaseous products through said drum in contact with said filling, substantially as described.

4. The combination with the inclosing casing, of a revoluble perforated drum therein, having an inlet adjacent to its central portion and discharge-apertures adjacent to its periphery, a filling of comminuted material in said drum, a fluid-receptacle below the lowest portions of said drum, a trough above said fluid-receptacle inclosing a portion of said drum, and an endless carrier provided with buckets passing over said drum and depending below said drum and trough and into said fluid-receptacle, substantially as described.

5. The combination with the inclosing casing, of a revoluble perforated drum located in said casing provided with a filling of comminuted material, said drum having an inlet adjacent to its center and peripheral discharge-apertures, a fluid-receptacle below the lowest portion of said drum, a trough above the fluid-receptacle and surrounding a portion of said drum, a filtering and settling tank, a passage communicating from said trough to said tank, a passage connecting said tank with said fluid-receptacle and means for supplying the fluid in said fluid-receptacle to said drum at a point above the level of said trough, substantially as described.

6. The combination with the inclosing casing, of a revoluble perforated drum located in said casing provided with a filling of comminuted material, said drum having an inlet adjacent to its center and peripheral discharge-apertures, a fluid-receptacle below the lowest portion of said drum, a trough above the fluid-receptacle and surrounding a portion of said drum, a filtering and settling tank, a passage communicating from said trough to said tank, a passage connecting said tank with said fluid-receptacle and an endless carrier provided with buckets passing over said drum, and depending below said drum and trough and into said fluid-receptacle, substantially as described.

7. The combination with an inclosing casing provided with a receiving-chamber and a filtering-chamber, a revoluble drum in said filtering-chamber, a filling of comminuted material, means for maintaining said material continuously in a wet condition, a centrifugal device in said receiving-chamber, means for introducing gaseous products into said centrifugal device, and means for passing said products from the receiving-chamber through said drum in contact with said filling, substantially as described.

8. The combination with an inclosing casing provided with a receiving-chamber and a filtering-chamber, a revoluble perforated drum in said filtering-chamber having an axial inlet-passage communicating with said receiving-chamber and provided with a filling of comminuted material, means for maintaining said material continuously in a wetted condition, a centrifugal settling device in said receiving-chamber and a forcing device communicating with said centrifugal device for forcing gaseous products into said receiving-chamber through said centrifugal device, substantially as described.

HARRY RICHMOND CHUBB.

Witnesses:
G. F. REDFERN,
JOHN E. BOUSFIELD.